March 19, 1968  J. S. GILES  3,373,889

PRESSURE SEALING JAR LID

Filed May 31, 1961

JOHN S. GILES
INVENTOR.

BY
ATTORNEYS

United States Patent Office 3,373,889
Patented Mar. 19, 1968

3,373,889
PRESSURE SEALING JAR LID
John S. Giles, Wayne, Ill., assignor to Phoenix Metal Cap Co. Inc., Chicago, Ill.
Filed May 31, 1961, Ser. No. 113,719
1 Claim. (Cl. 215—40)

The following specification relates to pressure sealing jar lids commonly used in domestic or home canning procedures.

It is common practice to seal a preserving jar, bottle or the like having a smooth-lipped mouth, by means of a lid containing a plastic sealing composition. This sealing composition is a uniform layer of synthetic plastic, rubber or the like. Whether the contents of the jar are filled in cold or by hot-packing, the mouth of the jar or bottle is covered with a lid containing a plastic lining opposite the lip of the receptacle. By means of a screw-threaded cap, the lid is held in place while the receptacle and its contents are heated in a boiling water bath or an autoclave (steam pressure vessel).

In the course of this heating operation, provision must be made for adequate venting of the air, steam and the like above the contents in the receptacle. Where the plastic lining of the lid has a smooth surface which is pressed down on the equally smooth lip of the receptacle, there is necessarily a resistance to the ready venting of the gases. This necessitates a prolonged venting operation.

As the jar, its contents and the lid are heated, the plastic lining of the latter is softened and under the pressure of the screw cap will fit tightly over the lip of the receptacle.

Subsequent cooling establishes a vacuum in the head space of the receptacle. The atmospheric pressure on the outside of the lid will therefore hold the lid hermetically in contact with the lip of the receptacle. The softened plastic material may even adhere to the lip and form a more efficient seal. The main factor is the perfection of physical contact at the interface of the gasket and the lip of the jar.

It has now been discovered that the lining of the lid can be materially improved if it is given a surface texture or configuration which is rough, or it may be said to resemble pebbled leather and have an indented or sinuous, wrinkled surfacce. This effect has been likened to the surface of an "orange peel." or "elephant hide." By providing such a rough surface, the plastic layer or coating of the lid will rest lightly upon the lip of the jar, even though the cap is screwed tight. As long as the jar remains unheated, the surface of the lining will provide free transverse travel for the ready venting of the gases from the head space.

These gases will be substantially vented, and the head space practically filled with steam before the lining becomes soft enough to yield to the pressure of the cap and form a continuous surface in engagement with the lip of the jar. In fact, the lip of the jar sinks into the softening layer of plastic, and the latter thus makes a sealing contact not only on the surface of the lip, but also upon the adjoining inner and outer surfaces of the jar.

On cooling the jar, the plastic layer hardens into position to maintain a hermetic seal. This seal is effective against the atmospheric pressure. The contents of the jar are thus preserved against contamination from the air, etc.

One of the objects of the invention is to provide a lid for a preserving jar or the like, which will offer initial resistance to the compressing effect of the screw cap in a degree not possible with the ordinary smooth surface of the lining composition.

Another object of the invention is to provide a rough or undulating surface on the sealing composition, such that channels provide free transverse movement of the gases being vented at the initial temperatures of preserving.

A further object of the invention is to effect hermetic sealing as a step subsequent to the venting of the gases.

Another object of the invention is the utilization of an inner aggregate of filling material to provide a definitely roughened surface useful for the above purposes.

As illustrating the invention and by way of example, I have shown the preferred form in the accompanying drawings in which:

FIG. 1 is a fragmentary plan view of an improved lid for sealing receptacles such as preserving jars and the like;

Figure 1:
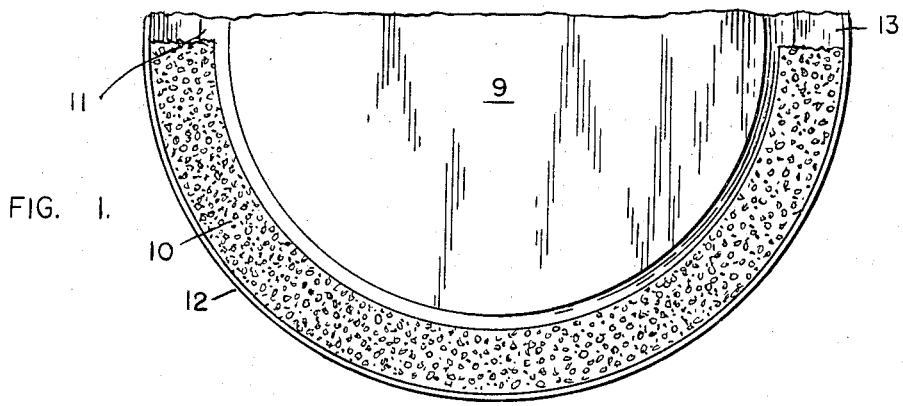
Figure 2:
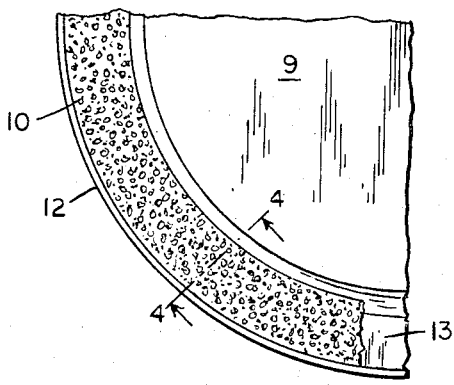
FIG. 2 is a fragmentary plan view showing the lid with the sealing compound partially applied.
Figure 3:
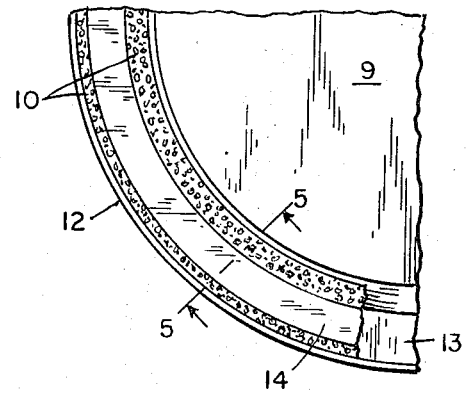
FIG. 3 is a similar view of the lid after the lining composition has been deformed by continuous engagement with the lip of the jar.
Figure 4:
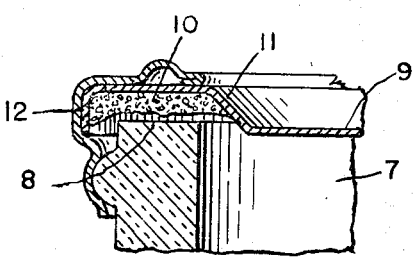
FIG. 4 is a fragmentary vertical cross-section taken on the line 4—4 of FIG. 2, showing the preliminary application of the lid.

Briefly considered, a particular formulation of the lining composition is utilized to establish a rough or uneven surface opposite the lip of the jar. This is especially true with present day use of synthetic rubbers and plastic rubber substitutes. This roughened surface may be the result of unequal evaporation of the plastic composition, in which the surface dries faster than the interior of the mass, resulting in wrinkling or similar skin effect. It may also be due to the presence of discrete particles of an inert filler around which the surface of the elastomer as it evaporates, forms an uneven or rough effect.

In the drawing, the jar 7 has been illustrated with the customary screw-threaded exterior and a smooth lip 8.

The usual metallic lid 9 is provided opposite the lip 8 with a layer of plastic composition 10. This composition may extend over the entire inner surface of the lid 9. However, it is common practice to provide a central depression 11 in the lid spaced from the peripheral edge 12. This produces a peripheral channel 13 which receives the composition 10.

The plastic composition 10 itself is formed from a rubber, rubber substitute or synthetic thermoplastic composition. It is flowed on or otherwise deposited in the channel 13 and caused to dry.

In this drying operation, the free surface of the deposit 10 becomes rough or uneven. This is a skin effect resulting from the evaporation of the solvent from the surface more rapidly than the drying from within.

This uneven or rough surface texture may also be accomplished by mixing solid discrete particles of an inert filler. This filler is entirely surrounded by the plastic. Therefore, in the evaporation of the solvent, the composition acquires a wrinkled, rough or uneven surface enhanced by the presence of the solid particles of inert filler within the body of the composition.

When the jar 7 is filled and the lid 9 applied, the rough surface of the plastic layer 10 rests on a multiplicity of raised points at the surface of the lining. This provides free transverse channels for the escape of the gases and steam from the head space of the jar. The protuberances or uneven projections of the cold, plastic layer are not disturbed by the pressure applied by the screw cap on the jar.

Figure 5:
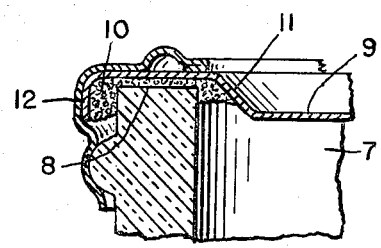
FIG. 5 is a similar vertical cross-section on the line 5—5 in FIG. 3, showing the final position taken by the lid on the lip of the jar.

It is only after the temperature of the jar and its contents has been raised noticeably, that the lining composition becomes soft enough so that it will sink down over the upper lip of the jar into the position shown in FIG. 5. When this occurs, the surface of the composition 10 is impressed to provide a smooth surface 14 conforming to the lip 8. In fact, the sealing composition 10 engages the lip 8 over the extended area to form a fully hermetic seal. In certain cases there is even an adherence between the composition 10 and the surface 8 sufficient to further seal the lid to the jar independently of the pressure of the atmosphere acting on the lid.

Production of the cellular structure and rough surface texture is the result of a controlled rate of evaporation of a volatile organic solvent (in this case, normal heptane), from a solvent rubber-cement.

The gasket compound is produced by milling inert fillers, reinforcing pigments, anti-oxidants, and release agents into blends of natural and synthetic elastomers. This compounded solid stock is then cut up and dissolved in the heptane solvent by churning. The liquid gasket-cement is then deposited into the peripheral sealing channel of lids or closures, and subjected to a drying operation which evaporates the solvent at a controlled rate.

Drying conditions which develop the proper cellular structure and rough surface texture are obtained as follows.

Air is heated by steam or hot water heat-exchangers to approximately 140° F. This air is conducted into the dryers in a counter-flow direction to the passage of the caps through the dryer. As a result, the air entering the dryer at 140° F. first contacts the coated lids or closures as they are about to emerge from the dryer. At this point the composition is practically dry and free from solvent. As the air moves back through the dryer zones, it progressively gives up its heat and emerges at the closure entrance at approximately 100° F. Thus the liquid composition is dried in progressive stages from 100° F. to 140° F. over a period of approximately 90 minutes.

The volume of air required is controlled so that the vaporized solvent is always diluted to a concentration of less than one tenth of the lower explosive limit.

Notably this improved practice results in a higher degree of vacuum and better keeping qualities than ordinarily attainable.

Comparative tests in the degree of vacuum attained under varying applications of lid-closing torque are shown in the following table for the present (A) and four competitive brands (B, C, D and E) of home canning lids.

The tests were made using half-pint home canning jars. Each contained water with one-half inch head-space, were filled at room temperature and after closing were held in a boiling water bath for twenty minutes and allowed to cool.

| Closing torque (pounds) | 30 | 40 | 50 | 60 | 100 |
|---|---|---|---|---|---|
| Vacuum in inches: | | | | | |
| A | 23 | 17 | 22 | 23 | 22 |
|   | 23 | 22 | 23 | 20 | 19 |
| B | 20 | 17 | 0 | 6 | 0 |
|   | 21 | 3 | 0 | 6 | 0 |
| C | 20 | 16 | 15 | 6 | 10 |
|   | 13 | 8 | 14 | 14 | 5 |
| D | 22 | 15 | 18 | 14 | 13 |
|   | 20 | 14 | 15 | 18 | 6 |
| E | 21 | 20 | 23 | 20 | 23 |
|   | 18 | 0 | 20 | 22 | 11 |

It is to be noted that consistently high vacuums were produced in the instant procedure independently of increase in application of torque applied to the screw cap (band) by which the lid was closed down on the jar lip.

This was in contrast to other brands where good vacuum was developed at very low applied torque on the screw caps, but the vacuum became erratic and diminished with increase in applied torque.

It is evident that the smooth surface of the plastic liners caused premature sealing, preventing satisfactory venting of gases at all but very low closing pressures.

In contrast the rough surface of the instant lining (gasket) composition resisted sealing in the cold (during closing operation at all applied pressures) thus delaying sealing until venting was complete and then allowed the heated, softened plastic to seal the lid.

Control of the drying temperature is important, as the above conditions must be maintained within reasonable limits, or the correct cellular structure and rough or undulated surface texture are not obtained. If the temperature is too high at the start, there is a rapid skin-over of the outer surface, and the evaporating solvent may swell the gasket rather than permit gradual drying into a rough surface.

On the other hand, the use of latex or vinyl plastisols are less likely to develop cellular structure and undulating surface by control of drying conditions alone. It may be necessary to incorporate "blowing agents" to obtain the desired surface.

The rough surface may be accompanied by the production of an inner cellular structure of the type illustrated in the Taliaferro Patent 1,427,133.

The production of the desired rough surface texture is greatly improved by the presence in the plastic composition of discrete particles of inert fillers. These are completely surrounded by the plastic composition. However, in drying, the contained particles and their coating form projections from the normal surface and increase the degree of roughness or pebbled effect.

A great variety of plastics can be used in the production of the novel lining for the gasket. Thus natural crepe rubber may be the selected elastomer. However, the idea can also be exemplified by a completely synthetic elastomer such as styrene-butadiene rubber (SB–R). It is however preferred to use equal parts of natural crepe rubber and SB-R rubber. Varying the ratios and types of elastomers result in changing the physical properties of plasticity, permanent set and tensile strength of the sealing gasket, as may be desired.

It is of course essential that the plastic be one of suitable solubility. Aliphatic solvents such as heptane and hexane are suitable. These are appropriate solvents for natural rubber (SB–R) butyl rubber (GR–I), poly-butadiene and poly-isoprene synthetic equivalents of natural rubber.

Where aromatic type solvents, such as benzol, are acceptable, many other oil-resistant synthetic rubbers can be used. These include chloroprene polymers (neoprene) and the butadine and acrylonitrile compounds such as those available under the trade names, "Butaprene," "Chemigum," "Hycar," "Paracril" or "Polyser."

The elastomers must be compounded with suitable fillers to reinforce and modify their physical properties of deformation under pressure. A proper balance of different types of fillers in the elastomers achieves the desired plasticity, hardness, degree of adhesion of the gasket to the jar and lid and the required cohesion of the gasket itself. Desirable and satisfactory fillers used alone or in combination are whiting, barytes and asbestos.

A release agent is desirable to reduce the adhesion of the gasket to the glass and permit easy removal of the jar lid from the jar when the package is opened for use.

In like manner, known anti-oxidants are desirable to insure the stability of the elastomers on aging and prevent softening and resinification. A suitable example is symmetrical dibetanaphthyl para-phenylenediamine.

The following example is illustrative of the improved compound:

10% natural first latex crepe rubber
10% SB–R 23% styrene type
dibetanaphthyl paraphenylenediamine to 1% of total elastomers The elastomers are broken on a rubber mill and then compounded on a roll mill or in a Banbury mixer until uniform dispersion of the fillers throughout the rubber is achieved. The selected fillers will consist of

| | Percent |
|---|---|
| Barytes | 5 |
| Asbestos | 5 |
| Refined paraffin wax | 1 |
| Whiting | 69 |

The compounded stock is sheeted out on a roll mill, and then cut up into pieces suitable for dissolving in a churn.

Equal parts by weight of the above compound and heptane placed in the churn are agitated for eight hours at about 60 r.p.m. to achieve solution.

The resultant cement contains 50% solids by weight and is adjusted to the correct coating viscosity by minor additions of the solvent. The correct coating viscosity is approximately 7,000 centipoises.

As previously detailed, the solvent cement composition is deposited in the peripheral sealing channel of home canning lids and the like, which are then carried through a drier being exposed to circulating air of progressively increasing temperatures from 100° F. to 140° F. in a period of approximately 90 minutes.

The inventive method and the novel sealing lid have been described above by way of example without limitation in materials and form within the scope of the following claim.

What I claim is:

1. A sealing lid for face-to-face engagement with the smooth lip of a receptacle, said lid having an inner homogeneous thermoplastic lining formed of a synthetic thermoplastic polymeric material containing wholly embedded discrete particles of inert material with those particles adjacent the surface of said lining projecting out of the normal plane of said surface and although wholly coated by said thermoplastic material producing a rough uneven surface pressure resistant at atmospheric temperature to form a rough venting surface but being yieldable at higher processing temperatures to form a sealing surface.

References Cited

UNITED STATES PATENTS

| 2,952,374 | 9/1960 | Pryale | 215—40 |
| 2,971,633 | 2/1961 | Tevander et al. | 215—40 |
| 2,957,784 | 10/1960 | Schiefelbein | 117—132 |
| 2,940,872 | 6/1960 | Gusman | 117—132 |
| 2,720,329 | 10/1955 | Kochner | 215—40 |
| 3,032,826 | 5/1962 | Brillinger | 215—40 |
| 2,389,761 | 11/1945 | Burgeni | 215—40 |
| 1,427,133 | 8/1922 | Taliaferro | 215—40 |
| 2,021,205 | 11/1935 | Spahn | 215—40 |
| 2,085,337 | 6/1937 | Spahn | 215—40 |
| 843,022 | 2/1907 | Fenn. | |

JOSEPH R. LECLAIR, *Primary Examiner.*

EARL DRUMMOND, FRANKLIN T. GARRETT, *Examiners.*

R. PESHOCK, *Assistant Examiner.*